UNITED STATES PATENT OFFICE.

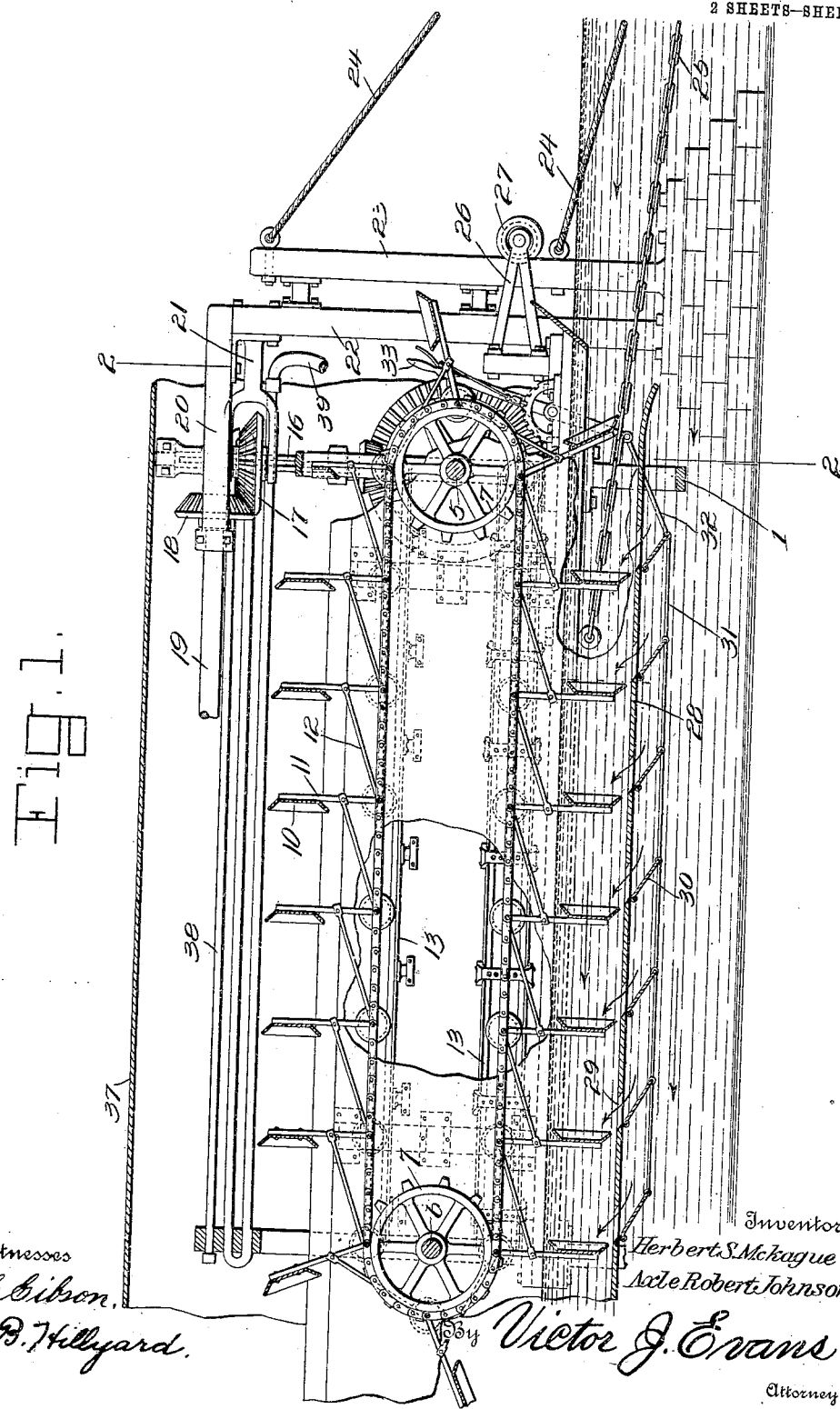

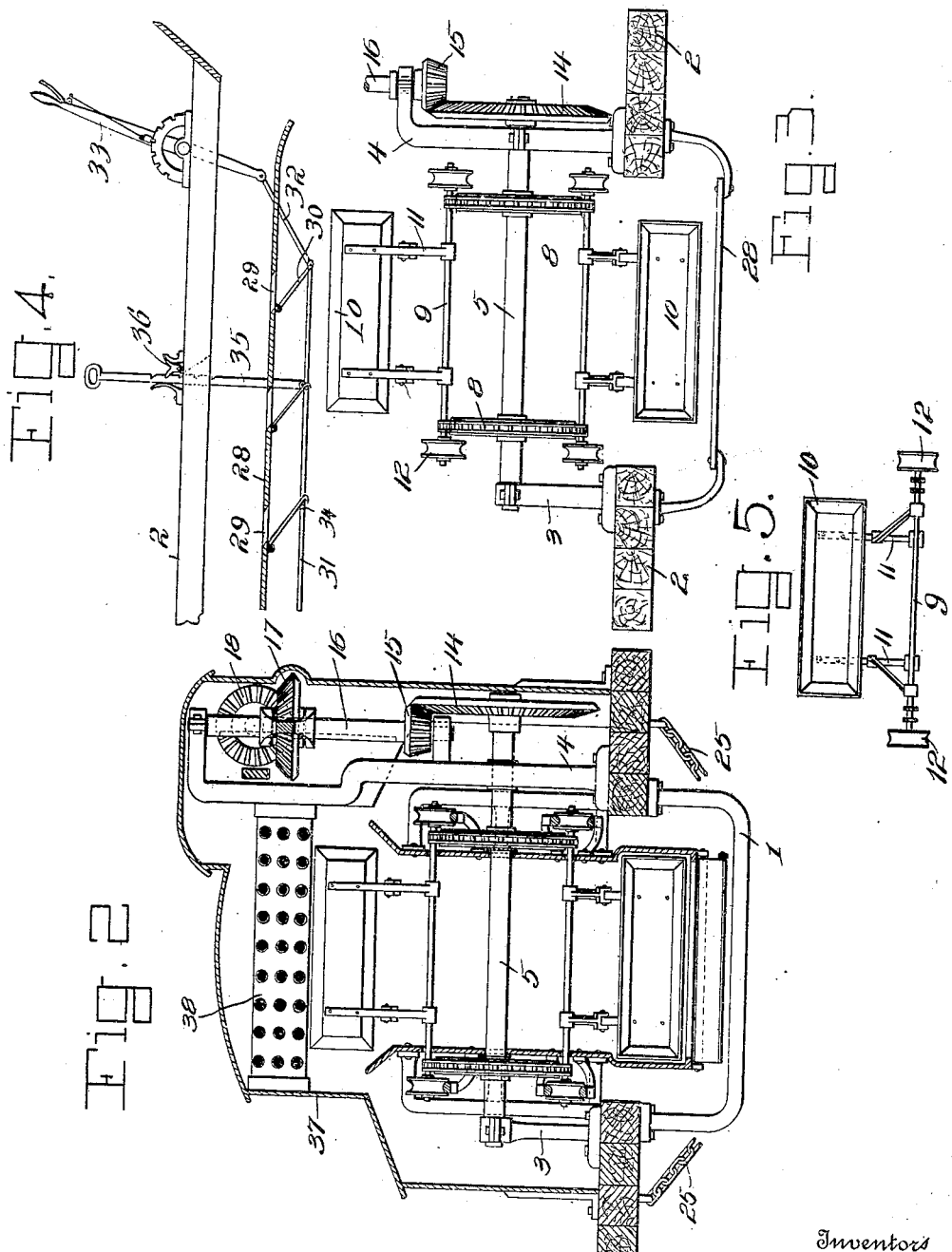

HERBERT S. McKAGUE AND AXLE ROBERT JOHNSON, OF ALTOONA, PENNSYLVANIA.

CURRENT-MOTOR.

979,320.  Specification of Letters Patent.  Patented Dec. 20, 1910.

Application filed August 10, 1909. Serial No. 512,238.

*To all whom it may concern:*

Be it known that we, HERBERT S. McKAGUE and AXLE ROBERT JOHNSON, citizens of the United States, residing at Altoona, in the county of Blair and State of Pennsylvania, have invented new and useful Improvements in Current-Motors, of which the following is a specification.

The purpose of the present invention is to devise a novel mechanism for utilizing the force of flowing water, such as rivers or streams, and converting such force into a form for effective use in the industrial arts for operating machinery or other mechanisms to be driven.

The invention contemplates primarily a float as a means for supporting the operating parts, said float maintaining a fixed relative position with reference to the surface of the stream, river or the like, upon which it may be placed. The mechanism also embodies an endless chain provided with buckets, which latter receive the impact of the flowing water. Novel mountings are provided for the endless chain and peculiar means have been devised for transmitting the power to the mechanism or machinery to be operated.

The invention has for its further object to provide a mechanism, which will be effective in operation and utilize a maximum percentage of the force contained in the flowing water, the parts being of such construction and arrangement as to admit of access being readily had thereto for repairs or other desired purpose.

For a full understanding of the invention reference is to be had to the following description and to the drawings hereto attached, in which:—

Figure 1 is a view in elevation of a mechanism embodying the invention, showing the operating parts mounted upon a float, parts being broken away and parts in longitudinal section. Fig. 2 is a transverse section about on the line 2—2 of Fig. 1, looking to the left, as indicated by the arrows. Fig. 3 is an end view of the float and the endless power chain, together with the mountings therefor, the remaining parts being removed for the sake of simplicity of illustration and to avoid confusion in the showing. Fig. 4 is a detail sectional view, showing the manner of mounting and adjusting the deflectors. Fig. 5 is a modification of an element of the endless power chain.

Corresponding and like parts are referred to in the following description, and indicated in all the views of the drawings, by the same reference characters.

The float may be of any construction, and, as shown in Figs. 2 and 3, comprises transversely spaced members, which are connected in any convenient and substantial way, preferably by arched bars 1. Each member of the float is shown as comprising a series of wooden timbers 2, which are placed side by side and secured in any manner. The float may be of any length and width according to the size of the machine as a whole and the weight of the coöperating parts mounted thereon. Standards 3 and 4 are mounted upon the members of the float and support shafts 5 and 6, upon which are mounted sprocket wheels 7, which serve as supports for the elements of the power chain. The members of the float are spaced apart and the endless power chain is located so as to operate in the space formed between the float members. The endless power chain comprises two side chains 8, which are spaced apart and connected at intervals by means of rods or bars 9, thereby causing the two endless chains 8 to move in unison. Buckets 10 are mounted upon the rods or like supporting members 9 and are connected thereto by means of arms 11. Braces 12$^a$ connect one set of arms 11 with the adjacent rods 9, thereby holding the buckets firmly against the force expended thereon by the flowing water. The buckets 10 may be of any construction and outline and are shown as of oblong formation and with their whole sides arranged to receive the impact of the flowing water. The rods 9 are extended at their ends and provided with wheels 12, which are adapted to run upon upper and lower tracks 13. The upper tracks are single, whereas the lower tracks are double, as indicated most clearly in Figs. 1 and 2. By having the wheels 12 operate between a pair of lower tracks the buckets are prevented from vertical movement and at the same time are supported against displacement. This will be readily manifest.

The tracks 13 are supported in any manner, so as to sustain the upper and the lower runs of the endless power chain and at the same time direct the elements in their travel. The endless power chain may be of any length and is supported at its ends upon the sprocket wheels 7 mounted upon the transverse shafts 5 and 6 and at intermediate points upon the tracks 13 by means of the wheels 12, the latter being grooved so as to prevent lateral displacement of the power chain. Power may be taken from either one of the shafts 5 or 6 for operating the mechanism to be driven. As shown the shaft 5 is extended at one end and provided with a bevel gear wheel 14, which meshes with a bevel pinion 15, passed through the lower end of a vertical shaft 16, the latter being mounted in bearings attached to or forming a part of the framework. The shaft 16 being mounted upon the float moves therewith. A gear wheel 17 is keyed to the shaft 16 so as to rotate therewith, and is mounted to admit of the shaft 16 playing therethrough. A gear wheel 18 is in mesh with the gear wheel 17 and is fast to a shaft 19 mounted so as to convey power to the machinery or other mechanism to be driven. The gear wheels 17 and 18 are of the bevel type and the gear wheel 17 is mounted between the fork members 20 of a bracket arm 21 secured to a post or frame 22 mounted in a stationary manner in any way. The post or frame 22 is connected to a second post 23, the latter in turn being anchored or connected by guys 24 to securing means located either upon the shore or bank of the stream or to an anchor dropped upon the bed of the stream or river. The float is likewise anchored by means of a chain or cable 25. A bracket 26 secured to the front end of the float is provided with a wheel 27 adapted to engage the post 23, thereby supplementing the action of the chain or cable 25 in holding the float against the current of the stream or river.

A bottom 28 is located some distance below the plane of the float and the buckets of the lower run of the power chain are adapted to sweep thereover in close proximity thereto. A series of openings 29 are formed in the bottom 28 for the inflow of water. Deflectors 30 are located below the openings 29 and in the rear thereof and are hinged to the bottom 28 and are adjustable so as to present a greater or less effective surface to the action of the flowing water. The deflectors 30 direct the water below the bottom 28 upwardly through the openings 29 and into the space above said bottom, so as to reinforce or scatter the water confined between the several buckets. The deflectors 30 are connected for simultaneous movement and are attached to a rod or bar 31, which latter in turn is connected by means of a link 32 with an operating lever 33 mounted upon the float and provided with the usual hand latch to coöperate with a toothed segment for holding the parts in adjusted position.

In the modification shown in Fig. 4 the deflectors 30 are engaged by pins or projections 34 of the connecting rod or bar 31, thereby admitting of any one of the deflectors being independently adjusted. For this purpose the bar 35 is adapted to be connected to the deflector to be adjusted and extends upwardly and is notched along one edge to engage a pawl 36 mounted upon the float so as to hold the bar 35 in the adjusted position. It is to be understood that the bar 35 may be provided for each deflector 30 and that any suitable means may be employed for holding the bar in an adjusted position.

In order to protect the working parts from weather a housing 37 is provided and incloses the same. This housing may be of any construction best adapted to the style and make of the machine. To prevent freezing in cold weather a heater 38 is provided and inclosed within the housing or casing 37. The heater may be of any variety, and, as shown, consists of a coil of pipe, which is adapted to be connected by means of a flexible hose pipe 39 with a boiler on shore or otherwise conveniently located.

It is proposed and contemplated in connection with the invention to mount an air compressor upon the float or framework supporting the power chain so as to be operated by the power derived therefrom. Such air compressor will be connected by a line of pipe to the distant point where a motor or other engine is located to be operated by the air conveyed thereto by the pipe line. Obviously the power generated by the power chain may be expended in any convenient way according to existing conditions and the nature of the mechanism to be driven.

From the foregoing description, taken in connection with the accompanying drawings, the advantages of the construction and of the method of operation will be readily apparent to those skilled in the art to which the invention appertains, and while we have described the principle of operation of the invention, together with the device which we now consider to be the embodiment thereof, we desire to have it understood that the device shown is merely illustrative, and that such changes may be made when desired as are within the scope of the claims appended hereto.

We claim:—

1. In a current motor, the combination of a float, a housing mounted upon the float and comprising vertical walls, an endless power chain mounted upon the float, rods provided at intervals in the length of the power chain and extending through slots formed in the vertical walls of the housing, arms extended from the rods and provided at their outer ends with buckets, wheels mounted upon the outer ends of the rods beyond the vertical walls of the housing, and upper and lower tracks exterior to the housing and supported thereby and adapted to have the wheels at the outer ends of the rods travel thereon.

2. In a current motor, the combination of a float, a housing mounted upon the float and comprising a bottom and vertical walls, the bottom having openings at intervals in its length, an endless power chain mounted upon the float and provided at intervals in its length with buckets, the latter adapted to operate between the vertical walls of the housing and close to the bottom thereof, deflectors pivotally connected to the bottom of the housing in the rear of the openings formed therein, and means for adjusting the deflectors to any relative angular position.

3. In a current motor, the combination of a float, a housing mounted upon the float and comprising a bottom and vertical walls, the bottom having openings at intervals in its length, an endless power chain mounted upon the float and provided at intervals in its length with buckets, the latter adapted to operate between the vertical walls of the housing and close to the bottom thereof, deflectors pivotally connected to the bottom of the housing in the rear of the openings formed therein, a rod adapted to engage the deflectors so as to move the same in series, and independent means for moving the deflectors whereby any one of the series may be adjusted separately and independently of the others.

In testimony whereof we affix our signatures in presence of two witnesses.

HERBERT S. McKAGUE.
AXLE ROBERT JOHNSON.

Witnesses:
   ISAIAH SCHEELINE,
   J. M. BLUMENTHAL.